United States Patent [19]
Belden, Jr.

[11] 3,919,638
[45] Nov. 11, 1975

[54] MICROWAVE DETECTION INSTRUMENT

[75] Inventor: Lorne H. Belden, Jr., Louisville, Ky.

[73] Assignee: General Electric Company, Louisville, Ky.

[22] Filed: Aug. 10, 1973

[21] Appl. No.: 387,540

[52] U.S. Cl. .................. 324/95; 324/72.5; 325/363; 343/703
[51] Int. Cl.² .................. G01R 21/04; G01R 31/02
[58] Field of Search ............ 324/95, 72.5; 343/703; 325/363, 67

[56] References Cited
UNITED STATES PATENTS

| | | | |
|---|---|---|---|
| 3,423,679 | 1/1969 | Smith | 324/95 |
| 3,641,439 | 2/1972 | Aslan | 325/363 |
| 3,721,900 | 3/1973 | Andrews | 343/703 |
| 3,760,271 | 9/1973 | Bach, Jr. et al. | 324/95 |

*Primary Examiner*—Alfred E. Smith
*Assistant Examiner*—Ernest F. Karlsen
*Attorney, Agent, or Firm*—Prangley, Dithmar, Vogel, Sandler, Stotland

[57] ABSTRACT

An instrument for detecting microwave energy and for giving an accurate measurement of the power density thereof, which instrument needs no internal amplifier and is substantially unaffected by polarization or modulation of the electromagnetic waves includes a planar array of parallel-connected diode detectors each having a pair of antenna leads forming a dipole antenna, each of the diode detectors having a pair of output conductors passing through one or more ferrite beads and thence to a meter. The diode array may include groups of diodes having different antenna lead lengths to detect different frequencies of microwave energy, the meter being selectively switched between the outputs of the different groups. The diode array is embedded at the center of a sphere of material transparent to microwaves and the diode antenna leads may be etched on a circuit board.

9 Claims, 11 Drawing Figures

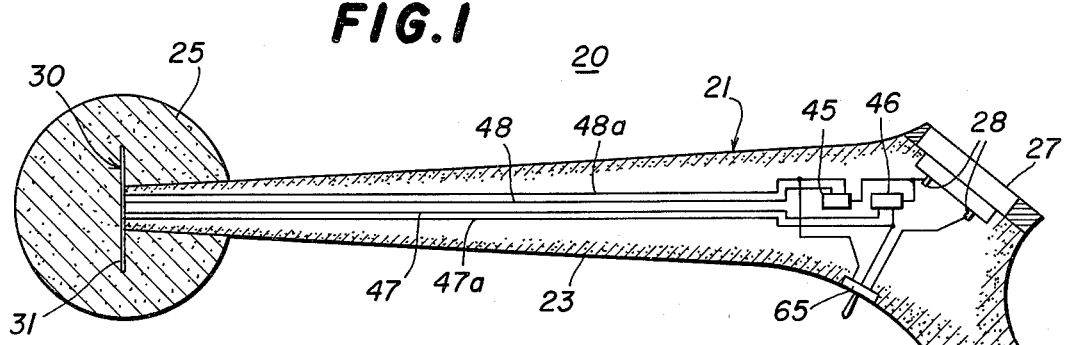
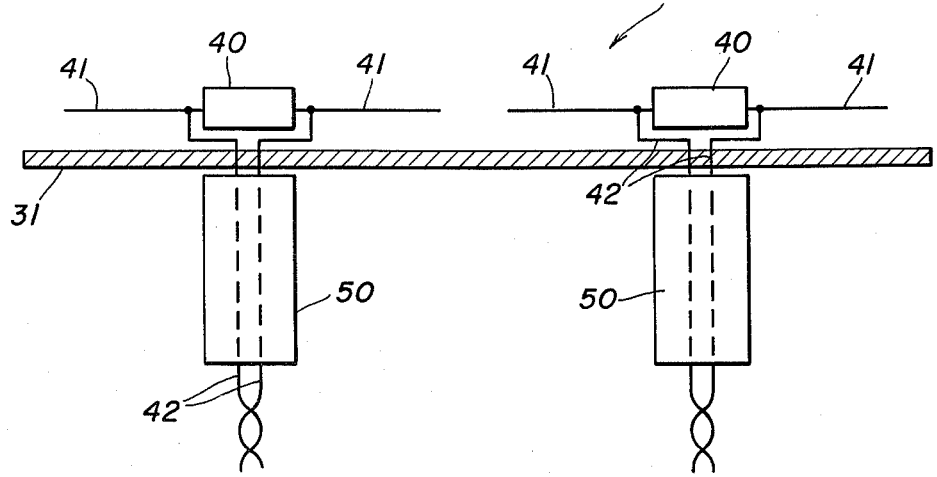
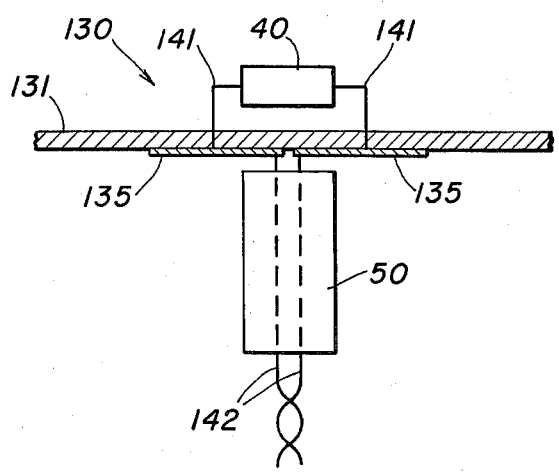
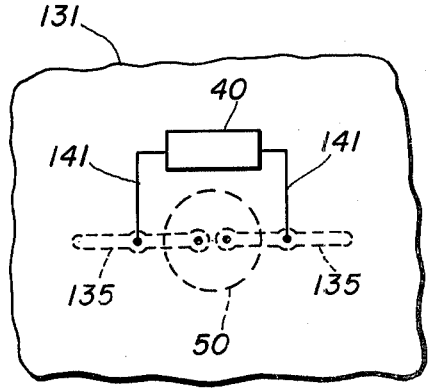

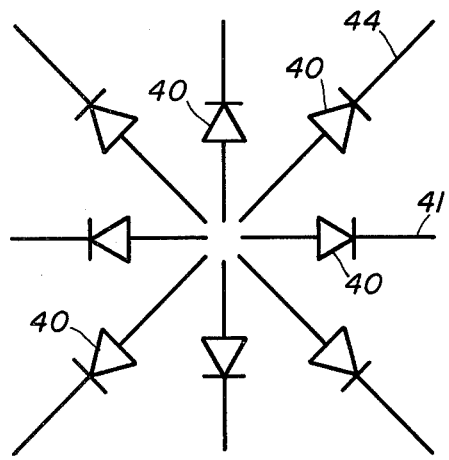
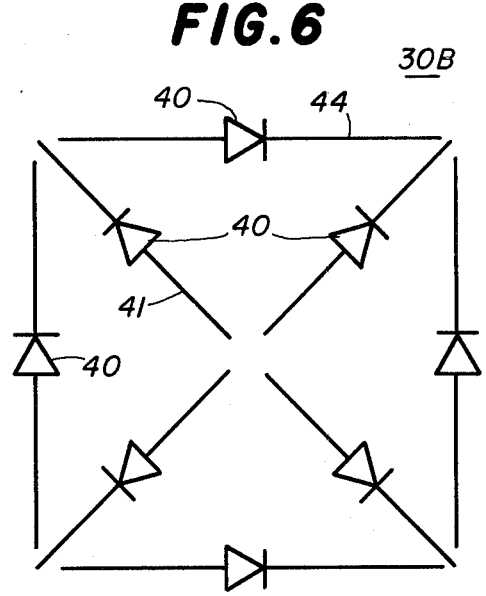
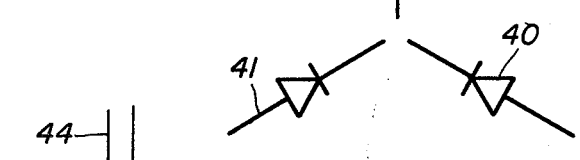
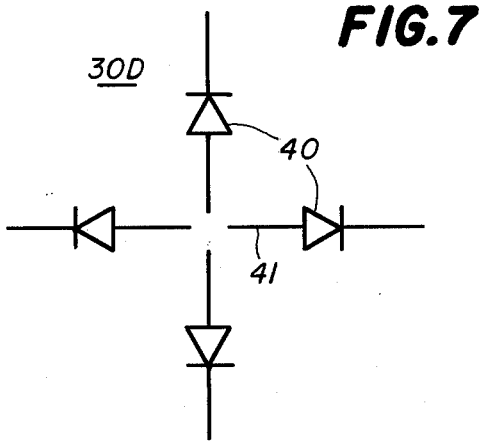
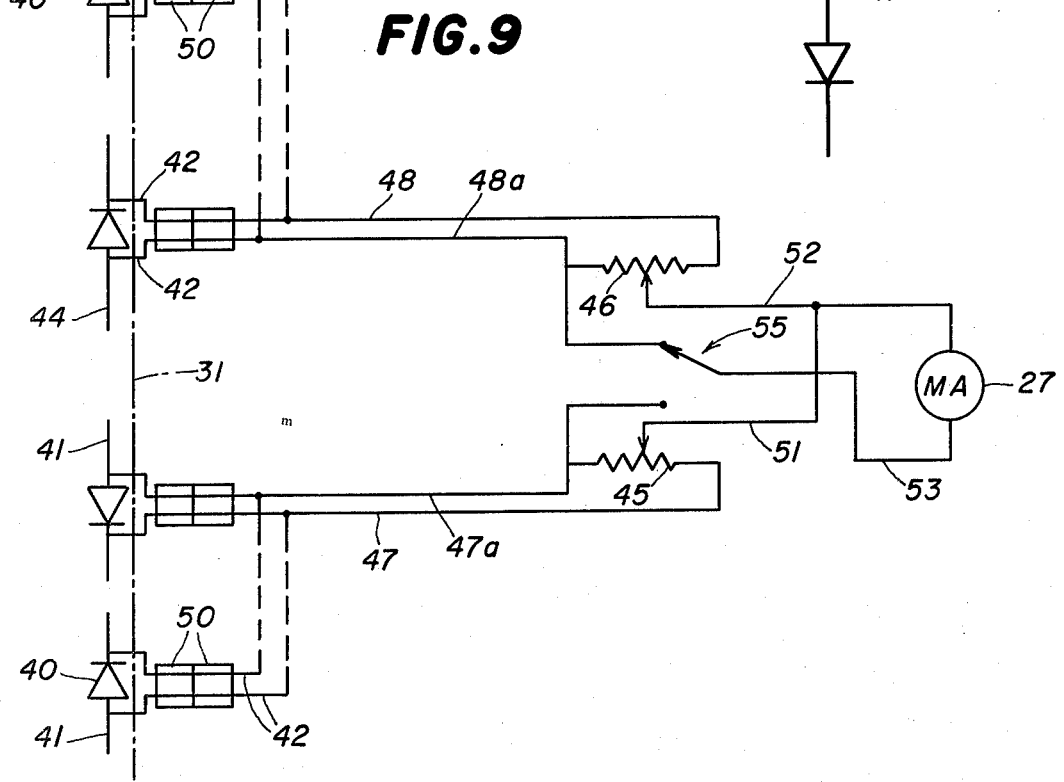

MICROWAVE DETECTION INSTRUMENT

BACKGROUND OF THE INVENTION

The present invention relates to microwave radiation sensors, and in particular to instruments for detecting and measuring leakage of electromagnetic radiation at microwave frequencies. The invention is specifically concerned with a field instrument for detecting and measuring microwave leakage radiation from microwave ovens.

Microwave energy is employed in numerous types of electronic products such as microwave communication relays, modern medical diathermy machines, some industrial heating installations and microwave ovens. Despite manufacturers' efforts to provide completely shielded enclosures and other safety features for the microwave sources in such electronic products, particularly consumer products, studies have indicated that under certain conditions, such as shipping damage, certain comsumer products utilizing microwave energy emit radiation in excess of recommended health levels.

Accordingly, it is desirable to have instrumentation for quickly and easily detecting and quantitatively measuring the microwave radiation leakage from products employing microwave energy.

The radiation damage limits as established by government regulations are based on the measurement of the average incident power density measured in a plane aperture. Since the average incident power denstiy is proportional to the square of the average electric field vector, a field instrument must supply an output which is proportional to this quantity. Also, since the electric field is a vector quantity, the field instrument must respond to all directions of polarization in a similar manner, i.e., the device should be polarization insensitive. An additional requirement of an instrument for use in measuring the leakage radiation from microwave ovens is that it be operable at both of the standard microwave oven frequencies of 2450 MHz and 915 MHz, and that it accurately read an average microwave power of 5 mw/cm$^2$.

One type of instrument which can be used for detecting the radiation leakage from microwave ovens utilizes microwave diodes in an antenna array, such an instrument being disclosed in the U.S. Pat. No. 3,721,900 issued to C. L. Andrews on Mar. 20, 1973, and assigned to the assignee of the present invention. The Andrews instrument, which utilizes an antenna having three geometrically and electrically symmetrical diode detector circuits connected in parallel, is relatively insensitive to the polarization of the electromagnetic waves. However, the Andrews device is designed to detect only a single frequency of microwave energy and, more importantly, the output of this instrument is not entirely independent of the modulation of the electromagnetic waves being measured, which modulation dependency may introduce errors into the radiation measurements.

Microwave diodes are ordinarily considered to operate in three response regions, viz., (1) a square-law region wherein the diode DC current or voltage is proportional to the square of the applied microwave voltage; (2) a linear response region wherein the diode output is proportional to the microwave voltage; and (3) a transition response region wherein the diode output is proportional to some exponential of the applied microwave voltage greater than one but less than two. Since the power density of microwave energy is proportional to the square of the electric field, it is necessary to operate the microwave diode detectors in their square-law response region in order to obtain an accurate measurement of the power density of the electromagnetic radiation.

In practical cases the microwave field is not an unmodulated field, but is more or less strongly modulated depending upon the type of power supply used. Errors in average power measurements can exist if a diode is operated above the square-law region when measuring modulated microwave signals if the diode was calibrated using an unmodulated signal. These same errors may exist if the diode is calibrated using a particular modulation function and one attemps to measure the signal with a different modulation function. The errors result from the fact that the modulation of the microwave signal tends to shift its power level to a point outside the square-law response region of the microwave diode detector, the shift normally being in the form of a boost in the power level to a region above the square-law response region of the diode. In actual instrumetns, errors as large as 50% may occur.

SUMMARY OF THE INVENTION

It is the purpose of the present invention to provide a simple field instrument for detecting and measuring microwave energy wherein the detected microwave energy is used to directly drive a meter movement so that no internal amplifier is required, and wherein the instrument is relatively insensitive to both polarization and modulation of the electromagnetic wave.

It has been found that the extent of the square-law response region of a diode detector is a function of the load impedance of the diode, so that the square-law response region may be extended by appropriate adjustment of the load impedance. It has also been found that where the diode detectors may form individual dipole antennas, in which case the extent of the square-law response region of the diode is also dependent on the length of the dipole antenna leads. Thus, it is possible to so extend the square-law response region of the diode detector that the power level of the detected microwave energy will remain in that square-law response region even after modulation of the electromagnetic wave. Accordingly, the accuracy of the power density measurements made with the instrument will be relatively unaffected by any difference in modulation between the detected wave and the wave used in calibrating the instrument. It has further been found that the diode detectors may be arranged in a parallel connected non-directional array so that the addition of the diode outputs produces a signal which is proportional to the power density of the detected microwave energy while being relatively insensitive to polarization of the electromagnetic waves.

Therefore, it is a general object of the present invention to provide an instrument for detecting and measuring microwave electromagnetic radiation by the use of an array of interconnected diode detectors, the extent of the square-law response regions of which are maximized by providing a load impedance which presents a low DC resistance to the rectified output of the diode detectors while presenting a high RF impedance to the microwave signal.

It is an important object of the present invention to provide an instrument for detecting microwave electromagnetic radiation and measuring the power density thereof regardless of modulation up to a peak to average ratios of 5 to 1 thereof, the instrument comprising an array of interconnected diode detectors each having an effectove response region wherein the diode detector output is proportional to the power density of the incident microwave electromagnetic radiation, the extent of the effective response region varying generally inversely with the DC load impedence of the diode detector, impedance means coupled to each of the diode detectors and presenting a high RF impedance and a low DC impedance to the rectified output of the diode detectors thereby to maximize the extent of the effective response region and means connected to the impedance means for measuring the additive total rectified output of the diode detectors, whereby the output of the instrument is proportional to the power density of the incident microwave electromagnetic radiation over a range of power densities sufficiently wide to render the instrument substantially insensitive to modulation of the microwave electromagnetic field.

In connection with the foregoing object, it is another object of this invention to provide an instrument of the type set forth, wherein the impedence means includes ferrite impedance means, each of the diode detectors having a pair of output conductors passing through the ferrite impedance means.

It is another object of this invention to provide an instrument of the type set forth wherein each of the diode detectors includes a pair of antenna lead conductors forming a dipole antenna.

Still another object of this invention is to provide a nondirectional instrument of the type set forth, wherein the diode detectors are disposed in an array with the antenna lead conductors thereof all disposed in a common plane and arranged symmetrical with respect to a common axis normal to the plane.

Yet another object of this invention is to provide a nondirectional instrument of the type set forth, which includes a plurality of first diode detectors having antenna lead conductors of a first predetermined length for detecting radiation of a first nicrowave frequency, and a plurality of second diode detectors each having antenna lead conductos of a second length for detecting radiation of the second microwave frequency, and first and second impedance means respectively connected to the first and second groups of diode detectors, and a switch for conecting the measuring means to the outputs of a selected one of the first nad second groups of diode detectors.

Further features of the invention pertain to the particular arrangement of the parts of the microwave detection instrument whereby the above-outlined and additional operating features thereof are attained.

BRIEF DESCRIPTION OF THE DRAWINGS

FIG. 1 is a view in vertical section of a microwave detection intrument contructed in accordance with and ebodying the features of the present invention;

FIG. 2 is an enlarged view in vertical section of the circuit mounting board showing the mounting of the array of diode detectors thereon;

FIG. 3 is a fragmentary view in vertical section, similar to FIG. 2, showing an alternative embodiment of the circuit mounting board for the diode detector array;

FIG. 4 is a fragmentary top plan view of the portion of the diode detector array illustrated in FIG. 3;

FIG. 5 is a diagrammatic representation of a first nondirectional array of diode detectors for detecting either of two different frequencies of microwave energy;

FIG. 6 is a diagrammatic representation of the orientation of diode detectors in a second array for detecting either of two different frequencies of microwave energy;

FIG. 7 is a diagrammatic representation of the orientation of the diode detectors in a third array for detecting a single frequency of microwave energy;

FIG. 8 is a diagrammatic representation of the orientation of diode detectors in a fourth nondirectional array for detecting a single frequency of microwave energy;

FIG. 9 is a schematic circuit diagram of the instrument of FIG. 1;

DESCRIPTION OF THE PREFERRED EMBODIMENTS

Figure 10:
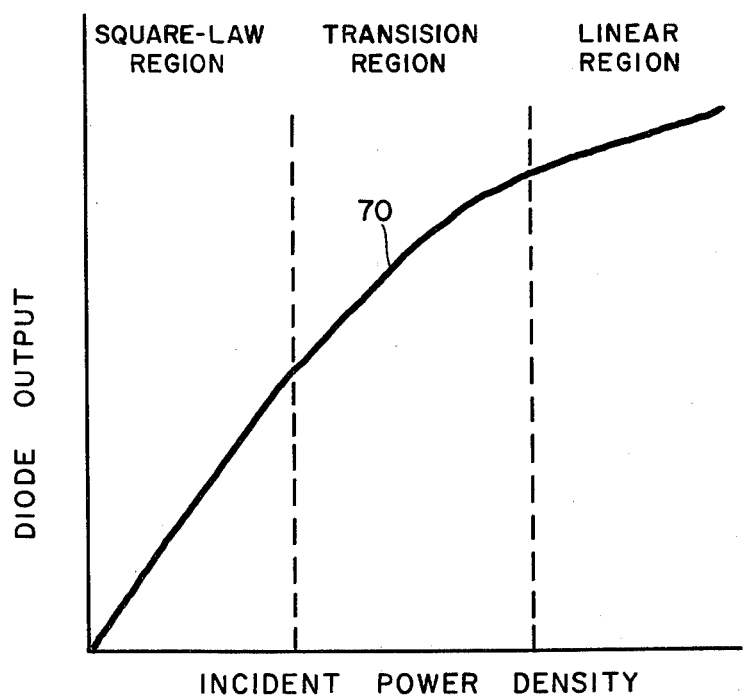
FIG. 10 is a graph plotting the output characteristic curve of a typical diode detector and indicating the several response regions of the diode.

Referring to FIGS. 1, 2 and 5 through 9 of the drawings, there is illustrated a microwave detection instrument, generally designated by the numeral 20, constructed in accordance with and embodying the features of the present invention. The instrument 20 is preferably mounted in a housing 21 which is shaped generally in a pistol configuration, the housing 21 including a handle portion 22, and an elongated barrel portion 23 integral with the handle portion 22 and extending outwardly therefrom and connected at the outer end thereof to a spherical tip portion 25. Preferably, the housing 21 is constructed of a lighweight low dielectric constant material, such as styrofoam. Mounted in the end of the barrel portion 23 immediately above the handle portion 22 is a meter 27 having a pair of terminals 28, the meter 27 being mounted for easy visibility by a user of the instrument 20 and preferably being a milliammeter which is calibrated to read in units of milliwatts per square centimeter.

Embedded in the spherical tip portion 25 centrally thereof is a diode detector array, generally designated by the numeral 30, which includes a rigid circuit mounting board 31 preferably constructed of a low dielectric constant material and having mounted thereon a plurality of diode detectors 40. Each of the diode detectors 40 includes a pair of collinear antenna leads 41 respectively extending outwardly from the opposite ends thereof to form an individual dipole antenna. Respectively connected to the antenna leads 41 adjacent to the inner ends thereof are two relatively low resistance output conductors 42 which pass through the circuit mounting board 31 and thence through a cylindrical ferrite bead 50 which is disposed on the opposite side of the circuit mounting board 31 from the diode detectors 40.

The outputs of the diode detectors 40 in the diode array 30 are connected in parallel, with the diode detectors 40 arranged in a symmetrical planar configuration so that the additive total output of the diode detectors 40 will be proportional to the square of the microwave electric field commponent in the plane of the diodes and thereby component substantially insensitive to polarization of the electromagnetic waves to be deteted. Referring to FIGS. 5 through 8 of the drawings, there are illustrated four different nondirectional diode array configurations, respectively designated 30A, 30B, 30C and 30D, which may be utilized to produce an output which is substantially independent of the polarization of the microwave electromagnetic field. In each of these configurations, the antenna leads of the diode detectors are all disposed at a common plane and are arranged symmetrically with respect to a common axis perpendicular to that plane. The array 30D of FIG. 7 includes four diode detectors 40 arranged in a generally cruciform configuration equiangularly spaced about a common axis which is perpendicular to the plane of the antenna leads 41. In FIG. 8, array 30C includes three diode detectors 40 equiangularly spaced about an axis perpendicular to the plane of the antenna leads 41. In each of the arrays 30C and 30D, the diode detectors 40 comprising the array are all identically constructed and have antenna leads 41 of identical lengths for detecting electromagnetic radiation of a single microwave frequency.

In FIG. 5, there is illustrated an array 30A which includes eight diode detectors 40, four of the diode detectors 40 having antenna leads 41 of a first predetermined length and being arranged in an array identical to the array 30D of FIG. 7. The other four of the diode detectors 40 in the array 30A have antenna leads 44 somewhat longer than the antenna leads 41 and being arranged in a second array which is also identical to the array 30D of FIG. 7 but is rotated 45% with respect to the array of the short-lead diodes. Thus, there is provided a composite array including a first group of diodes having relatively short antenna leads 41 for detecting electromagnetic radiation of a first microwave frequency and a second group of diode detectors having relatively long anntenna leads 44 for detecting the electromagnetic radiation of a second microwave frequency.

In FIG. 6 there is illustrated a diode detector array 30B which is an alternative form of the composite array 30A of FIG. 5. In FIG. 6, array 30B includes eight diode detectors 40, with four of the diode detectors 40 each having antenna leads 41 of a first relatively short length and being arranged in a configuration identical to the array 30D of FIG. 7. The remaining four diode detectors 40 are all provided with antenna leads 44 somewhat longer than the antenna leads 41 and are arranged as the sides of a square, the diagonals of which are formed by the antenna leads 41.

In each of the diode detector arrays of FIGS. 5 through 8, all of the diode detectors having antenna leads of the same length are connected in parallel with each other.

Referring to FIG. 9, there is illustrated a schematic circuit diagram for a preferred embodiment of the instrument 20 which utilizes either the diode array 30A or the diode array 30B. As can be seen from FIG. 9, the pair of output conductors 42 of each of the diode detectors 40 passes through one or more cylindrical ferrite beads 50 which are arranged in end-to-end relationship. In FIG. 9, two of the ferrite beads 50 have been provided for each of the diode detectors 40, since it has been determined that in the preferred embodiment of the invention this provides the optimum inpedance characteristic for the microwave frequencies commonly used in microwave ovens, viz., 2450 MHz and 915 MHz. However, it will be appreciated that any number of ferrite beads 50 could be utilized depending upon the characteristics of the microwave energy being detected.

The output conductors 42 of the diode detectors 40 having the short antenna leads 41 are all connected in parallel to a pair of common conductors 47 and 47a, which are in turn respectively connected to the fixed terminals of a calibration potentiometer 45. In like manner, the output conductors 42 of the diode detectors 40 having the long antenna leads 44 are connected in parallel to a pair of common conductors 48 and 48a, which are in turn respectively connected to the fixed terminals of a calibration potentiometer 46. The wipers of the potentiometers 45 and 46 are respectively connected by conductors 51 and 52 to one of the terminals 28 of the meter 27, the other terminal of the meter 27 being connected by a conductor 53 to the movable contact of a single-pole double-throw switch 55, the fixed contacts of which are respectively connected to the conductors 47a and 48a.

Before describing the operation of the microwave detection instrument 20 it is useful to first examine the operating characteristics of the microwave diode detector 40. Referring to FIG. 10 of the drawings, there is shown a graph plotting the output curve 70 of a typical microwave diode as a function of the power density of the incident electromagnetic radiation. The three different regions of the diode response characteristic are clearly designated in FIG. 10. In utilizing the microwave detection instrument 20 for detecting leakage of microwave energy from microwave ovens the power density level of interest is 5 mw/cm$^2$, which is the maximum radiation power level permitted by the federal government at a specified distance from the external surface of an electronic oven.

This measurement is a time average of the microwave field intensity, but an instrument such as a microwave detection instrument 20, which is based on the DC output voltage of microwave diodes, will only indicate the time average of the microwave field intensity if the RF signal at the diode remains within the square-law response region of the diode. In other words, in order to obtain an accurate measurement of the time average of the microwave signal, the peak signal should be within the square-law response region of the diode. However, modulation of the microwave signal may result in the peak signal being as much as five times the average signal level. Thus, in order to accurately measure an average power density of 5 mw/cm$^2$, regardless of the modulation up to a peak to average ratio to 5 to 1 of the incident wave, the square-law response region of the diode should extend up to approximately 25 mw/cm$^2$.

In the detection instrument of the aforementioned Andrews U.S. Pat. No. 3,721,900, the upper limit of the square-law response region of the microwave diodes was at or below 5 mw/cm$^2$, whereby the power denstiy readings of the instrument were highly modulation dependent. The Andrews instrument utilized twisted leads of fine high-resistance wire to connect the diode outputs to the instrument meter in order to present a high impedance at microwave frequencies thereby to isolate the meter from the microwaves But this arrangement also presented high DC resistance to the rectified outputs of the diodes, this resistance being in excess of 10,000 ohms.

It has now been found that this high load resistance on the diodes is related to the narrow extent of the square-law response region of the diodes. More particularly, it has been found that by utilizing a low load impedance, the square-law response region of the diodes can be significantly extended. Thus, it is a significant feature of the present invention that there is provided a diode output impedance which presents an effective RF block, while at the same time presenting a low DC resistance to the rectified output of the diode.

In the present invention this impedance characteristic is provided by utilizing relatively low-resistance diode output conductors 42 and passing them through one or more ferrite beads 50. The wire passing through the ferrite bead may be characterized as a series inductance and a series resistance, the resistance being high at microwave frequencies and low at low frequencies and, therefore, presenting an effective RF block while at the same time providing the low DC resistance to maximize the extent of the square-law response region of the diode. Both of the output conductors 42 of the microwave diode 40 are passed through the same ferrite bead 50 since it has been found that the microwave diode has a higher square-law response level when both output leads are run through the same ferrite than when they are run through separate ferrites. This effect is believed to be the result of mutual coupling between the two leads in the single ferrite.

In the preferred embodiment of the invention, each microwave diode 40 has its output leads 42 pass through two consecutive ferrite beads 50 since it has been found that this arrangement provides more effective RF blocking at the 915 MHz frequency. It will, however, be understood that any desired number of ferrite beads may be used with each diode in order to obtain the optimum impedance characteristics for the specific diode and the specific microwave frequencies involved. It will also be recognized that other impedance means, such as capacitive bypassing, could also be used to provide an RF block with low DC resistance, but they do not work as effectively as the ferrite beads to produce an optimum square-law response region for the diode.

In operation, the milliammeter 27 is calibrated, by use of the appropriate one of the calibration potentiometers 45 or 46, to read mid-scale for the microwave power denstiy level of interest at the microwave frequency of interest. Thus, for example, if it is desired to measure leakage from a microwave oven at 915 MHz, the switch 55 is moved to the position illustrated in FIG. 9 to connect the milliammeter 27 across the output of the parrallel-connected diodes with the long antenna leads 44. The milliammeter 27 is then calibrated by use of a reference source to read mid-scale at a power density of five milliamperes per square centimeter (or any other power level of interest). The tip portion 25 of the instrument 20 is then placed adjacent to the appliance being tested and the power density level of microwave leakage radiation is directly read from the milliammeter 27.

The diode array 30 is so positioned in the spherical tip portion 25 that the center of the array is located at the center of the spherical tip portion 25, the radius of the spherical tip portion 25 being equal to the minimum distance from the test appliance at which leakage radiation measurements are to be taken. Thus, if the radiation measurement of interest is power density at a point two inches or more from the appliance, the radius of the spherical tip portion 25 would be two inches to insure that the center of the diode array 30 may not approach closer than 2 inches to the appliance under test. When it is desired to test for microwave energy at a frequency of 2450 MHz, the switch 55 is simply moved to the other position thereof, connecting the milliammeter 27 across the output of the diodes 40 having the short antenna leads 41, and the same procedure is followed as was described above.

Figure 11:
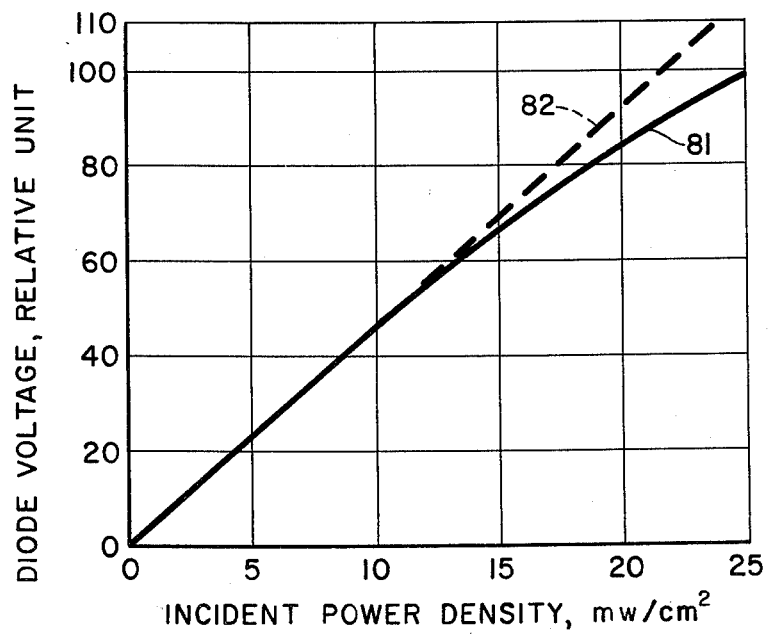
FIG. 11 is a graph plotting the output voltage characteristic of a diode detector with a load impedance in accordance with the present invention.

Referring to FIG. 11, there is illustrated a graph of the output characteristic of the microwave detection instrument 20, with the curve 81 indicating the output of the diodes 40 as a function of the incident power density, and with the broken line 82 indicating the ideal square-law response curve. It can be seen that the square-law response region of the diode extends to 15 mw/cm$^2$ with negligible error and to 25 mw/cm$^2$ with an error less than twenty percent, which is considered acceptable under current government regulations. Thus, the instrument 20 can provide fairly accurate measurements of the power density of the microwave radiation at a level of 5 mw/cm$^2$ even with a modulated signal having a peak to average ratio of 5 to 1.

Referring now to FIGS. 3 and 4 of the drawings, there is illustrated an alternative embodiment, generally designated by the numeral 130, of the diode array for use in the microwave detection instrument 20. The diode array 130 is formed on an etched circuit board 131, the microwave diodes 40 being mounted on one side of the board 131, with the antenna leads 141 thereof extending through the board 131 and respectively connected to antenna members 135 etched on the opposite side of the board 131. The antenna members 135 are spaced-apart collinear conductive strips having the adjacent ends thereof respectively connected to two output conductors 142 which are in turn passed through a ferrite bead 50 disposed on the same side of the board 131 as the etched antenna members 135. The circuit board 131 is preferably formed of material having a low dielectric constant and any of the nondirectional diode array configurations of FIGS. 5 through 8 may be mounted thereon.

In a constructional example of the microwave detection instrument 20, the instrument housing 21 is formed of styrofoam, the milliammeter 27 is a 0–1 milliammeter DC meter with a movement resistance approximately equal to 80 ohms, the calibration potentiometers 45 and 46 are each 500 ohm variable resistors, the microwave diodes 40 are of a type such as the Radio Corporation of America IN82AG semiconductor diodes, and the ferrite beads 50 are of a type such as Ferrox-cube No. Vk211 0713B. The diode detectors 40 having the short antenna leads 41 each has an overall length from the tip of one antenna lead 41 to the tip of the other antenna lead 41 of approximately three-quarters inch for detecting microwave energy at a frequency of 2450 MHz, while the diode detectors 40 having the long antenna leads 44 have an overall length from the tip of one antenna lead 44 to the tip of the other antenna lead 44 of approximately one inch for detecting microwave energy having a frequency of 915 MHz. These antenna lead lengths have been found to be optimum for detecting these particular microwave frequencies while at the same time providing for a maximum extent of the square-law response region of the diodes.

It will, however, be appreciated that other microwave diodes could be used and that circuit elements having other impedance values could be utilized to achieve the desired result of maximizing the square-law response region of the diodes if microwave energy of other frequencies is to be detected or if different ranges of power density levels are to be measured.

From the foregoing, it can be seen that there has been provided a simple and inexpensive field instrument for measuring the power density of electromagnetic microwave radiation, which instrument needs no internal amplifier and which is relatively insensitive to polarization or modulation of the incident electromagnetic waves.

More particularly, there has been provided a microwave detection instrument utilizing an array of diode detectors, wherein each of the diode detectors sees an output impedance which is an effective RF block but a relatively low DC resistance, thereby to maximize the extent of the square-law response region of the diode, in which region accurate measurements of the power density of the microwave radiation may be achieved.

There has also been provided a microwave detection instrument of the character described, wherein each of the diode detectors has a pair of output conductors which are passed through a ferrite impedance means.

In addition, there has been provided a microwave detection instrument of the character described, wherein each of the diode detectors is provided with a pair of antenna leads whereby each diode acts as an individual dipole antenna.

There has also been provided a microwave detection instrument of the character described, wherein the diode detector dipoles are arranged in a nondirectional planar array and are connected in parallel so that the addition of the outputs from the several diodes in the array produces a signal which is proportional to the square of the microwave electric field component in the plane of the diode array, i.e., proportional to the power density of the incident microwave energy.

Finally, there has been provided a microwave detection instrument of the type set forth, wherein the instrument may be calibrated to detect and measure microwave energy of either of two distinct microwave frequencies.

While there have been described what are at present considered to be the preferred embodiments of the invention, it will be understood that various modifications may be made therein, and it is intended to cover in the appended claims all such modifications as fall within the true spirit and scope of the invention.

What is claimed is:

1. A passive field instrument for detecting microwave electromagnetic radiation and measuring the power density thereof regardless of any modulation thereof and while consuming only the power thereof, said instrument comprising an array of diode detectors each having a pair of output conductors and each having an effective square-law response region wherein the diode detector output is proportional to the power density of the incident microwave electromagnetic radiation, the extent of said effective square-law response region varying generally inversely with the D.C. load impedence of said diode detector, means connected to the output conductors of each of said diode detectors for measuring the additive total rectified output of said diode detectors, and a plurality of ferrite members equal in number to said diode detectors and respectively coupled directly thereto and disposed between said diode detectors and said measuring means for presenting a high R.F. impedance and a low D.C. impedance to the retified output of said diode detectors, both of said output conductors of each diode detector passing directly through the associated one of said ferrite members thereby to maximize the extent of said effective square-law response region, and means interconnecting said diode detectors, said diode detectors being interconnected only bewtween said measuring means and said ferrite members, whereby the output of said instrument is proportional to the power density of the incident microwave electromagnetic radiation over a range of power densities sufficiently wide to render said instrument substantially insensitive to modulation up to a peak to average ratio of 5 to 1 of the microwave electromagnetic field.

2. The instrument set forth in claim 1, wherein said fererite members include a plurality of sets of ferrite members with said sets being equal in number to said diode detectors and respectively coupled thereto, both of the output conductors of each of said diode detectors passing through all ferrite members of the associated set of ferrite members.

3. A non-directional passive field instrument for detecting microwave electromagnetic radiation and measuring the power density thereof while consuming only the power thereof, said instrument comprising a plurality of first interconnected diode detectors for detecting electromagnetic radiation of a first microwave frequency, each of said first diode detectors including a pair of substantially collinear conductors of a first predetermined length forming a dipole antenna, a plurality of second interconnected diode detectors for detecting the electromagnetic radiation of a second predetermined microwave frequency, each of said second diode detectors including a pair of substantially collinear conductors of a second predetermined length forming a dipole antenna, each of said diode detectors having an effective square-law response region wherein the diode detector output is proportional to the power density of the incident microwave electromagnetic radiation, the extent of the effective square-law response region varying generally inversely with the D.C. load impedance of said diode detector, said first diode detectors being disposed in a first array with the conductors thereof all disposed in a common plane and arranged symmetrically with respect to a common axis normal to said plane, said second diode detectors being disposed in a second array with the conductors thereof all disposed in said plane and arranged symmetrically with respect to said axis, a first plurality of ferrite members equal in number to said first diode detectors and respectively coupled directly thereto for presenting a high R.F. impedance and a low D.C. impedance to the rectified outputs of said first diode detectors, each of said first diode detectors having a pair of output conductors both passing directly through the associated one of said first ferrite members thereby to maximize the extent of the effective square-law response region, a second plurality of ferrite members equal in number to said second diode detectors and respectively coupled directly thereto for presenting a high R.F. impedance and a low D.C. impedance to the rectified outputs of said second diode detectors, each of said second diode detectors having a pair of output conductors both passing directly through the associated one of said second ferrite members thereby to maximize the extent of the effective square-law response region, measuring means, a switch connected to said measuring means and said first and second impedance means for connecting said measuring means across a selected one of said first and second impedance means for providing a measurement of the additive total rectified output of the associated array of diode detectors which is relatively insensitive to polarization or modulation of the electromagnetic radiation.

4. The non-directional instrument set forth in claim 3, wherein said first array of diode detectors comprises a predetermined number of first diode detectors spaced equiangularly about said axis with said conductors of said first diode detectors disposed perpendicular to said axis, said second array of diode detectors including said predetermined number of second diode detectors spaced equiangularly about said axis with said conductors of said second diode detectors being disposed perpendicular to said axis, said first diode detectors alternating with said second diode detectors.

5. The non-directional instrument set forth in claim 3, wherein said first array of diode detectors comprises four first diode detectors spaced equiangularly about said axis with said conductors of said first diode detectors disposed perpendicular to said axis, said second array of diode detectors comprising four second diode detectors arranged substantially in a square configuration, said conductors of said first diode detectors lying along the diagonals of said square.

6. The non-directional instrument set forth in claim 3, and further including first and second variable calibration resistors respectively connected to said first and second arrays of diode detectors and adapted for connection in parallel with said measuring means.

7. The non-directional instrument set forth in claim 3, wherein said first and second arrays of diode detectors are embedded in a sphere of material transparent to microwaves with said axis passing through the center of said sphere.

8. The instrument set forth in claim 1, wherein each of said diode detectors includes a pair of substantially collinear antenna conductors respectively connected to said output conductors and cooperating to form a dipole antenna.

9. The instrument set forth in claim 3, and further including a circuit mounting board, said conductors of said diode detectors being etched on said circuit mounting board.

* * * * *